H. GILMORE & J. T. SPENCER.
Rein-Holder.

No. 167,891. Patented Sept. 21, 1875.

WITNESSES:
E. Wolff.
J. H. Scarborough.

INVENTOR:
H. Gilmore
J. T. Spencer
BY
ATTORNEYS.

UNITED STATES PATENT OFFICE.

HUGH GILMORE AND JOSEPH T. SPENCER, OF ST. LOUIS, MISSOURI.

IMPROVEMENT IN REIN-HOLDERS.

Specification forming part of Letters Patent No. 167,891, dated September 21, 1875; application filed March 6, 1875.

*To all whom it may concern:*

Figure 1:
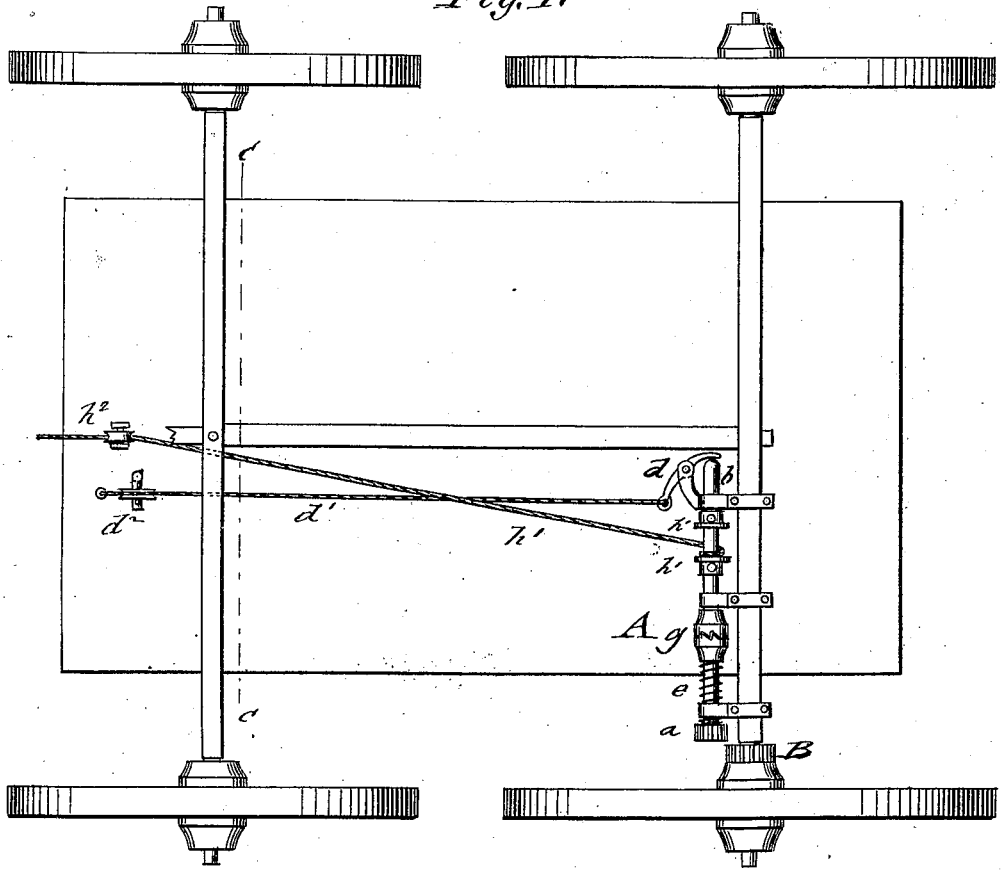
Figure 2:
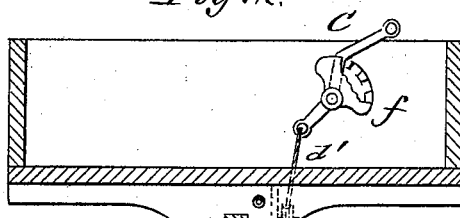
Figure 3:
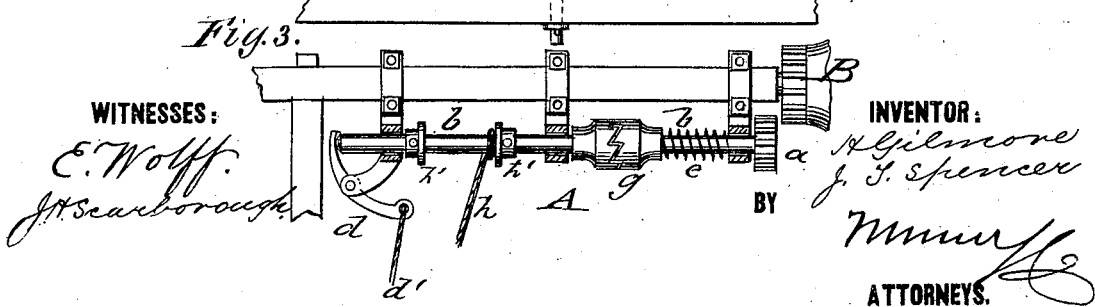

Be it known that we, HUGH GILMORE and JOSEPH T. SPENCER, of St. Louis, in the county of St. Louis and State of Missouri, have invented a new and Improved Horse-Hitching Attachment to Vehicles, of which the following is a specification:

In the accompanying drawing, Figure 1 represents a bottom view of a carriage with our horse-hitching device attached. Fig. 2 is a vertical transverse section of the carriage-body on the line $c\ c$, Fig. 1, showing governing-lever and rack at dash-board; and Fig. 3 is a detail side view of the hitching device attached to the hind axle.

Similar letters of reference indicate corresponding parts.

The object of our invention is to provide an improved horse hitching and safety attachment to vehicles, for enabling the occupant of any vehicle to hitch the horses easily and perfectly by a mere turn of a lever, so as to dispense with the use of weights or hitching-posts.

Our invention consists of a hitching attachment, which is applied to the hind axle of a vehicle, and made to gear with cogs on the hub of the hind wheel, by the action of a pivoted foot-lever at the front part or dash-board, which causes a hitching-line connected to the bridle-bits to be wound up and tightened, so that the horses are brought to a stop by the automatic action of the wheels on the hitching mechanism.

In the drawing, A represents our improved hitching mechanism, which is applied by suitable clips to the hind axle. A pinion, $a$, at the outer end of shaft $b$ of the hitching attachment A, may be thrown into gear with a cog-wheel, B, at the inside of the hub of the hind wheel. Shaft $b$ runs parallel with the hind axle, and slides in the box-clips by the action of a fulcrumed or bell-crank lever, $d$, in outward direction, being returned by the action of a spiral spring, $e$. The fulcrumed lever $d$ is connected by a strong wire or other cord, $d^1$, and pulley $d^2$, through the bottom of the vehicle to a foot-lever or treadle, C, at the front gate or dash-board, and is operated by depressing the lever C, which may be securely locked to a recessed rack or other fastening device, $f$, on leaving the vehicle. A clutch mechanism, $g$, is applied to the spindle-shaft near the pinion $a$, while a strong cord, $h$, is attached between collars $h^1$ of the inner part of the shaft, and extended along the body of the vehicle over a pulley, $h^2$, at the front part of the same, where a snap-hook fastens the lines which connect with the animal's head by passing through terrets of the harness to the bridle-bit.

When it is desired to hitch the horse the rack-lever is thrown down by the foot, which throws the pinion into gear with the hub. The revolution of the wheel winds up the cord on the shaft, and tightens the lines leading to the head of the animal, so that the same is compelled to stop. The backward motion of the animal turns the pinion in opposite direction, the slackening of the hitching-cord being prevented by the reverse action of the spring-clutch mechanism.

By this contrivance the occupant of a carriage is enabled to hitch the horse in an instant from the inside, leave the carriage, and unhitch on returning by disconnecting the lever, which releases the pinion from the hub, and slackens the lines by the unwinding of the cable-cord.

The horses may be easily and perfectly hitched by this simple and convenient attachment to the vehicles without the use of the common hitching devices, and also brought readily to a stop when running away.

Having thus described our invention, we claim as new and desire to secure by Letters Patent—

The combination of lever and cord $d\ d^1$, and sliding shaft $b\ b$, having end pinion $a$, spring $e$, clutch $g$, and cord $h$, with the rear axle of a vehicle, having cog-wheel B, as and for the purpose specified.

HUGH GILMORE.
      JOSEPH T. SPENCER.

Witnesses:
 JOHN G. FURBER,
 WM. F. VITTINGHOFF.